US012617493B1

(12) United States Patent
Lin et al.

(10) Patent No.: US 12,617,493 B1
(45) Date of Patent: May 5, 2026

(54) REAR DERAILLEUR WITH DAMPING FUNCTION

(71) Applicant: TIEN HSIN INDUSTRIES CO., LTD., Taichung City (TW)

(72) Inventors: Shang-Feng Lin, Taichung City (TW); Chang-Chun Kao, Taichung City (TW)

(73) Assignee: TIEN HSIN INDUSTRIES CO., LTD., Taichung City (TW)

( * ) Notice: Subject to any disclaimer, the term of this patent is extended or adjusted under 35 U.S.C. 154(b) by 0 days.

(21) Appl. No.: 19/068,007

(22) Filed: Mar. 3, 2025

(51) Int. Cl.
    *B62M 9/126*     (2010.01)
    *B62M 9/124*     (2010.01)

(52) U.S. Cl.
    CPC ............ *B62M 9/126* (2013.01); *B62M 9/124* (2013.01)

(58) Field of Classification Search
    CPC .............................. B62M 9/126; B62M 9/124
    See application file for complete search history.

(56) References Cited

U.S. PATENT DOCUMENTS

| | | | | | |
|---|---|---|---|---|---|
| 4,406,643 | A | * | 9/1983 | Shimano | B62M 9/1248 |
| | | | | | 474/82 |
| 6,135,904 | A | * | 10/2000 | Guthrie | B62M 9/122 |
| | | | | | 474/82 |
| 7,371,199 | B2 | * | 5/2008 | Joslyn | F16H 7/1218 |
| | | | | | 474/135 |
| 8,852,041 | B2 | * | 10/2014 | Yamaguchi | B62M 9/126 |
| | | | | | 474/80 |

| | | | | | |
|---|---|---|---|---|---|
| 8,870,692 | B2 | * | 10/2014 | Yamaguchi | B62M 9/126 |
| | | | | | 474/80 |
| 8,870,693 | B2 | * | 10/2014 | Shahana | B62M 9/121 |
| | | | | | 474/82 |
| 8,882,618 | B2 | * | 11/2014 | Yamaguchi | B62M 25/08 |
| | | | | | 474/82 |
| 8,900,078 | B2 | * | 12/2014 | Yamaguchi | B62M 9/122 |
| | | | | | 474/82 |
| 9,005,059 | B2 | * | 4/2015 | Suyama | B62M 9/122 |
| | | | | | 474/82 |
| 9,187,149 | B2 | * | 11/2015 | Yamaguchi | B62M 9/1244 |
| 9,227,696 | B2 | * | 1/2016 | Yamaguchi | B62M 9/126 |
| 9,228,643 | B2 | * | 1/2016 | Yamaguchi | B62M 9/16 |
| 9,290,235 | B2 | * | 3/2016 | Yamaguchi | B62M 9/16 |
| 9,303,763 | B2 | * | 4/2016 | Yamaguchi | B62M 9/122 |
| 9,377,089 | B2 | * | 6/2016 | Yamaguchi | B62M 9/126 |
| 9,463,846 | B1 | * | 10/2016 | Chang | B62M 9/1248 |
| 9,475,547 | B2 | * | 10/2016 | Jordan | B62M 9/1248 |

(Continued)

*Primary Examiner* — Henry Y Liu

(74) *Attorney, Agent, or Firm* — Apex Juris, pllc; Hilde M. L. Coeckx

(57)            ABSTRACT

A rear derailleur with a damping function includes a chain guide portion, a movable portion, a resilient member, and a damping assembly. The chain guide portion includes a shaft member engaged with the movable portion, the resilient member, and the damping assembly. The damping assembly includes at least one one-way bearing, an inner ring, an outer ring, a plurality of first damping disks, and a plurality of second damping disks. The one-way bearing is sleeved on the shaft member. The inner ring is located within the outer ring. An inner surface of the inner ring is engaged with the one-way bearing. An outer surface of the inner ring is engaged with the first damping disks. An inner surface of the outer ring is engaged with the second damping disks. A damping material is filled between the first damping disks and the second damping disks.

10 Claims, 9 Drawing Sheets

(56)     References Cited

U.S. PATENT DOCUMENTS

| | | | | |
|---|---|---|---|---|
| 9,669,900 B2 * | 6/2017 | Shirai | F16H 7/1236 |
| 9,845,134 B2 * | 12/2017 | Takachi | B62M 9/121 |
| 10,086,904 B2 * | 10/2018 | Lin | B62M 9/124 |
| 10,137,962 B2 * | 11/2018 | Celi | F16F 9/19 |
| 10,189,542 B2 * | 1/2019 | Wu | B62M 9/1242 |
| 10,315,728 B2 * | 6/2019 | Takachi | B62M 9/1248 |
| 10,351,208 B2 * | 7/2019 | Yamaguchi | B62M 9/1244 |
| 10,435,110 B2 * | 10/2019 | Calendrille | B62M 9/1244 |
| 10,435,111 B2 * | 10/2019 | Shipman | B62M 9/126 |
| 10,577,053 B2 * | 3/2020 | Brown | B62M 9/126 |
| 10,604,212 B2 * | 3/2020 | Takachi | B62M 9/1248 |
| 10,759,494 B2 * | 9/2020 | Shipman | B62M 9/1248 |
| 10,882,587 B2 * | 1/2021 | Chang | B62K 19/18 |
| 11,098,787 B2 * | 8/2021 | Ziegler | F16F 15/1292 |
| 11,110,993 B2 * | 9/2021 | Rodgers | B62M 9/1248 |
| 11,199,240 B2 * | 12/2021 | Brown | F16F 9/34 |
| 11,560,199 B2 * | 1/2023 | Rodgers | B62M 9/122 |
| 11,577,804 B2 * | 2/2023 | Braedt | B62M 9/128 |
| 11,649,875 B2 * | 5/2023 | Brown | F16F 9/10 |
| | | | 267/64.11 |
| 11,667,350 B2 * | 6/2023 | Chang | B62M 9/1244 |
| | | | 474/82 |
| 11,745,827 B2 * | 9/2023 | Garcia | B62M 9/125 |
| | | | 474/69 |
| 11,760,438 B2 * | 9/2023 | Peruzzo | B62M 9/1248 |
| | | | 474/80 |
| 11,814,138 B1 * | 11/2023 | Su | B62M 9/126 |
| 11,891,154 B2 * | 2/2024 | Sala | B62J 45/00 |
| 11,897,582 B2 * | 2/2024 | Ziegler | B62M 9/1248 |
| 11,975,800 B2 * | 5/2024 | Nishino | B62M 9/1242 |
| 11,987,324 B2 * | 5/2024 | Brown | B62M 9/1242 |
| 12,071,988 B2 * | 8/2024 | Choltco-Devlin | F16D 41/12 |
| 12,292,090 B2 * | 5/2025 | Choltco-Devlin | F16D 41/12 |
| 12,304,593 B2 * | 5/2025 | Nishino | B62M 9/132 |

| | | | | |
|---|---|---|---|---|
| 2007/0219029 A1 * | 9/2007 | Turner | B62M 9/16 |
| | | | 474/69 |
| 2008/0026890 A1 * | 1/2008 | Oseto | B62M 9/1242 |
| | | | 474/82 |
| 2008/0026891 A1 * | 1/2008 | Oseto | B62M 9/1242 |
| | | | 474/82 |
| 2009/0054183 A1 * | 2/2009 | Takachi | B62M 9/121 |
| | | | 474/80 |
| 2009/0291789 A1 * | 11/2009 | Ishikawa | B62M 9/1248 |
| | | | 474/82 |
| 2012/0083371 A1 * | 4/2012 | Yamaguchi | B62M 9/126 |
| | | | 474/80 |
| 2012/0083372 A1 * | 4/2012 | Yamaguchi | B62M 9/126 |
| | | | 474/80 |
| 2013/0203532 A1 * | 8/2013 | Jordan | B62M 9/1248 |
| | | | 474/82 |
| 2014/0371013 A1 * | 12/2014 | Yamaguchi | B62M 9/126 |
| | | | 474/122 |
| 2016/0046352 A1 * | 2/2016 | Shipman | B62M 9/128 |
| | | | 29/428 |
| 2016/0176478 A1 * | 6/2016 | Chang | B62M 9/126 |
| | | | 474/69 |
| 2016/0304160 A9 * | 10/2016 | Chang | B62M 9/121 |
| 2017/0113760 A1 * | 4/2017 | Lin | B62M 9/1248 |
| 2017/0174289 A1 * | 6/2017 | Wu | B62M 9/16 |
| 2018/0346058 A1 * | 12/2018 | Brown | B62M 9/126 |
| 2020/0298935 A1 * | 9/2020 | Wu | B62M 9/138 |
| 2021/0129939 A1 * | 5/2021 | Sala | B62M 9/128 |
| 2021/0362805 A1 * | 11/2021 | Ziegler | B62M 9/126 |
| 2022/0324534 A1 * | 10/2022 | Brown | B62M 9/1242 |
| 2023/0094161 A1 * | 3/2023 | Sala | H02J 7/02 |
| | | | 474/80 |
| 2023/0348018 A1 * | 11/2023 | Nishino | B62M 9/132 |
| 2024/0246633 A1 * | 7/2024 | Nishino | B62J 43/30 |
| 2024/0253736 A1 * | 8/2024 | Brown | B62M 9/1242 |

* cited by examiner

REAR DERAILLEUR WITH DAMPING FUNCTION

BACKGROUND OF THE INVENTION

Technical Field

The present disclosure relates generally to a derailleur for a bicycle, and more particularly to a rear derailleur with a damping function.

Description of Related Art

With the popularization of bicycles, the bicycles are no longer just a means for transportation, but important leisure and sports equipment in daily life. In recent years, as the market demand grows, bicycles with shifting functions, such as mountain bikes and road bikes, also are developed accordingly.

In general, a chain of the bicycle is tightened through a biasing force provided by a torsion spring of the rear derailleur in a rotation direction so as to maintain a tension of the chain, thereby ensuring that the bicycle could be ridden smoothly. However, when riding on forest trails or cross-country courses, it is common to encounter uneven road surfaces, such as rocks or obstacles. In these cases, the torsion spring of the rear derailleur may suffer from shock and may not be able to restore in time, and the biasing force may disappear instantly or be weakened, resulting in the chain being unable to be tightened. As a result, the problems, such as chain flinging, chain falling off, skipping chain, or making a misstep, may occur.

Therefore, the conventional rear derailleur of the bicycle still has room for improvement.

BRIEF SUMMARY OF THE INVENTION

In view of the above, the primary objective of the present disclosure is to provide a rear derailleur with a damping function so as to avoid the problems such as chain falling, skipping chain or making a misstep when riding a bicycle on uneven roads.

The present disclosure provides a rear derailleur with a damping function, including a base portion, a linkage assembly, a movable portion, a chain guide portion, a resilient member, and a damping assembly. The base portion includes a frame engaging section and a first pivoting section that are connected to each other. The linkage assembly includes a first linkage and a second linkage. An end of the first linkage and an end of the second linkage are pivotally connected to the first pivoting section, respectively. The movable portion includes a second pivoting section and a seat body that are connected to each other. The other end of the first linkage and the other end of the second linkage are pivotally connected to the second pivoting section, respectively, so that the first pivoting section, the linkage assembly, and the second pivoting section form a four-bar linkage. The seat body has a shaft bore. The chain guide portion includes a chain guide arm and a shaft member connected to the chain guide arm. A guide wheel and a tension wheel are pivotally connected to the chain guide arm, and the shaft member passes through the shaft bore. The resilient member is disposed between the seat body and the chain guide portion and provides a biasing force for a rotation of the chain guide portion. The damping assembly includes an inner ring, an outer ring, a plurality of first damping disks, a plurality of second damping disks, and at least one one-way bearing.

The inner ring is located within the outer ring, and an outer surface of the inner ring is engaged with the first damping disks. The outer ring is fixed to the seat body, and an inner surface of the outer ring is engaged with the second damping disks. The first damping disks and the second damping disks are in a staggered arrangement, and a damping material is filled between the first damping disks and the second damping disks. The at least one one-way bearing is engaged with an inner surface of the inner ring. The at least one one-way bearing is sleeved on the shaft member. The shaft member is freely rotatable in a first direction relative to the inner ring through the at least one one-way bearing. When the shaft member of the chain guide portion drives the first damping disks on the inner ring through the at least one one-way bearing to rotate in a second direction opposite to the first direction, the damping material provides damping for the first damping disks to rotate relative to the second damping disks.

The effect of the present disclosure is that the rear derailleur with the damping function could produce the damping effect by the at least one one-way bearing working with the first damping disks, the second damping disks, and the damping material. When the bicycle is ridden on an uneven road surface, the shaft member drives the first damping disks to rotate relative to the second damping disks through the at least one one-way bearing. At this time, the damping material provides damping for the first damping disks to rotate relative to the second damping disks so as to reduce the speed and the degree of the chain guide arm of the chain guide portion rotating in the second direction around the axis of the shaft. In this way, the chain could be quickly returned to an original position after being swung by an external force, so that the problem that the chain falls off due to insufficient tension could be prevented.

BRIEF DESCRIPTION OF THE SEVERAL VIEWS OF THE DRAWINGS

The present disclosure will be best understood by referring to the following detailed description of some illustrative embodiments in conjunction with the accompanying drawings, in which.

DETAILED DESCRIPTION OF THE INVENTION

Figure 1:
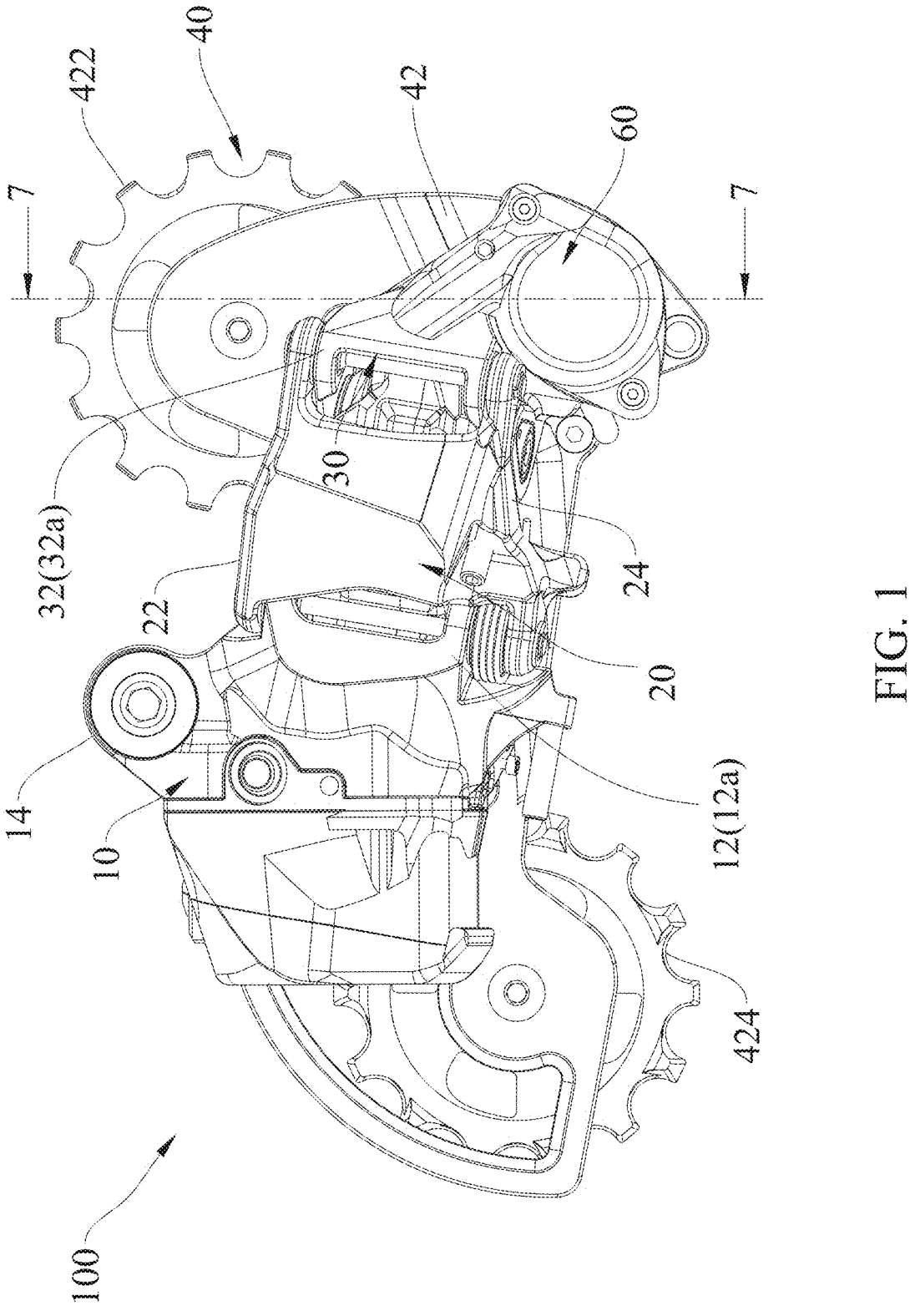
FIG. 1 is a front view of the rear derailleur with the damping function according to an embodiment of the present invention.
Figure 2:
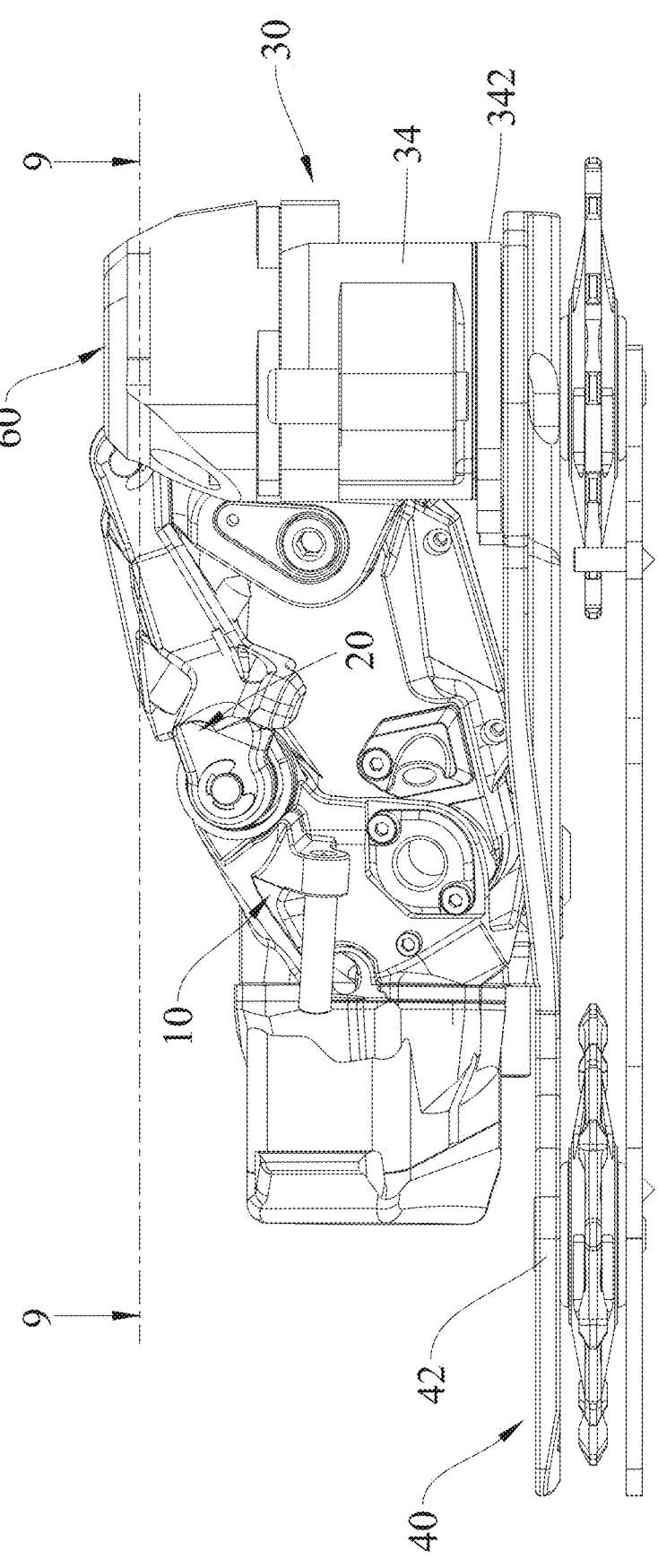
FIG. 2 is a top view of the rear derailleur with the damping function according to the embodiment of the present invention.
Figure 3:
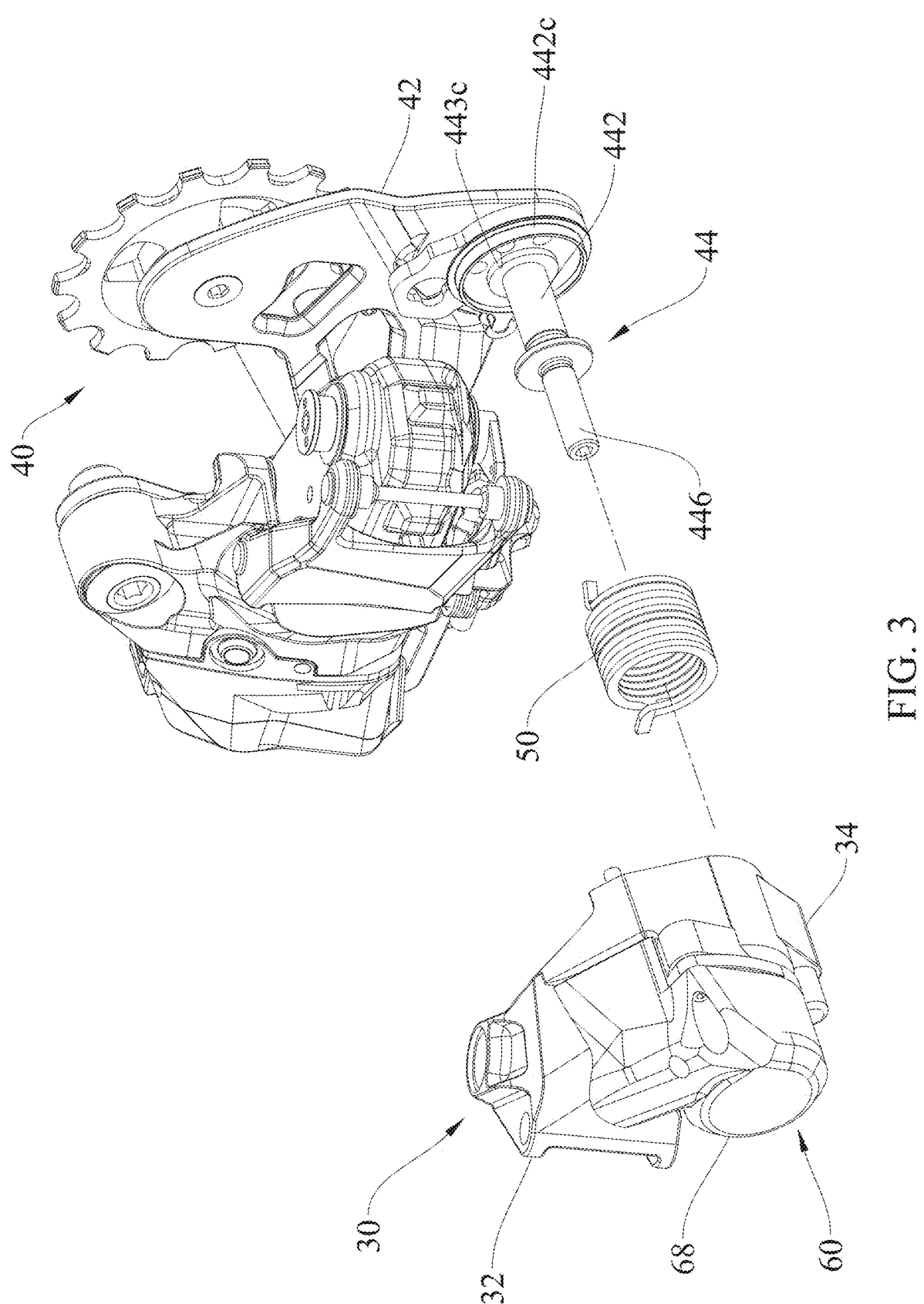
FIG. 3 is an exploded view of the rear derailleur with the damping function according to the embodiment of the present invention.

Referring to FIG. 1 to FIG. 3, a rear derailleur 100 with a damping function according to an embodiment of the present invention is shown. The rear derailleur 100 with the damping function includes a base portion 10, a linkage assembly 20, a movable portion 30, a chain guide portion 40, a resilient member 50, and a damping assembly 60.

The base portion 10 is configured to connect to a frame of a bicycle and is located on an outer side of a rear sprocket assembly of the bicycle. As shown in FIG. 1, the base portion 10 includes a frame engaging section 14 and a first pivoting section 12 that are connected to each other. The frame engaging section 14 is connected to the frame of the bicycle. The first pivoting section 12 has two first pivoting ends 12a disposed opposite to each other. Each of the first pivoting ends 12a is pivotally connected to the linkage assembly 20.

An end of the linkage assembly 20 is pivotally connected to the base portion 10. The movable portion 30 is pivotally connected to another end of the linkage assembly 20. The linkage assembly 20 includes a first linkage 22 and a second linkage 24. An end of the first linkage 22 and an end of the second linkage 24 are pivotally connected to the first pivoting section 12 of the base portion 10, respectively, and another end of the first linkage 22 and another end of the second linkage 24 are pivotally connected to a second pivoting section 32 of the movable portion 30, respectively, so that the first pivoting section 12, the linkage assembly 20, and the second pivoting section 32 form a four-bar linkage.

Figure 7:
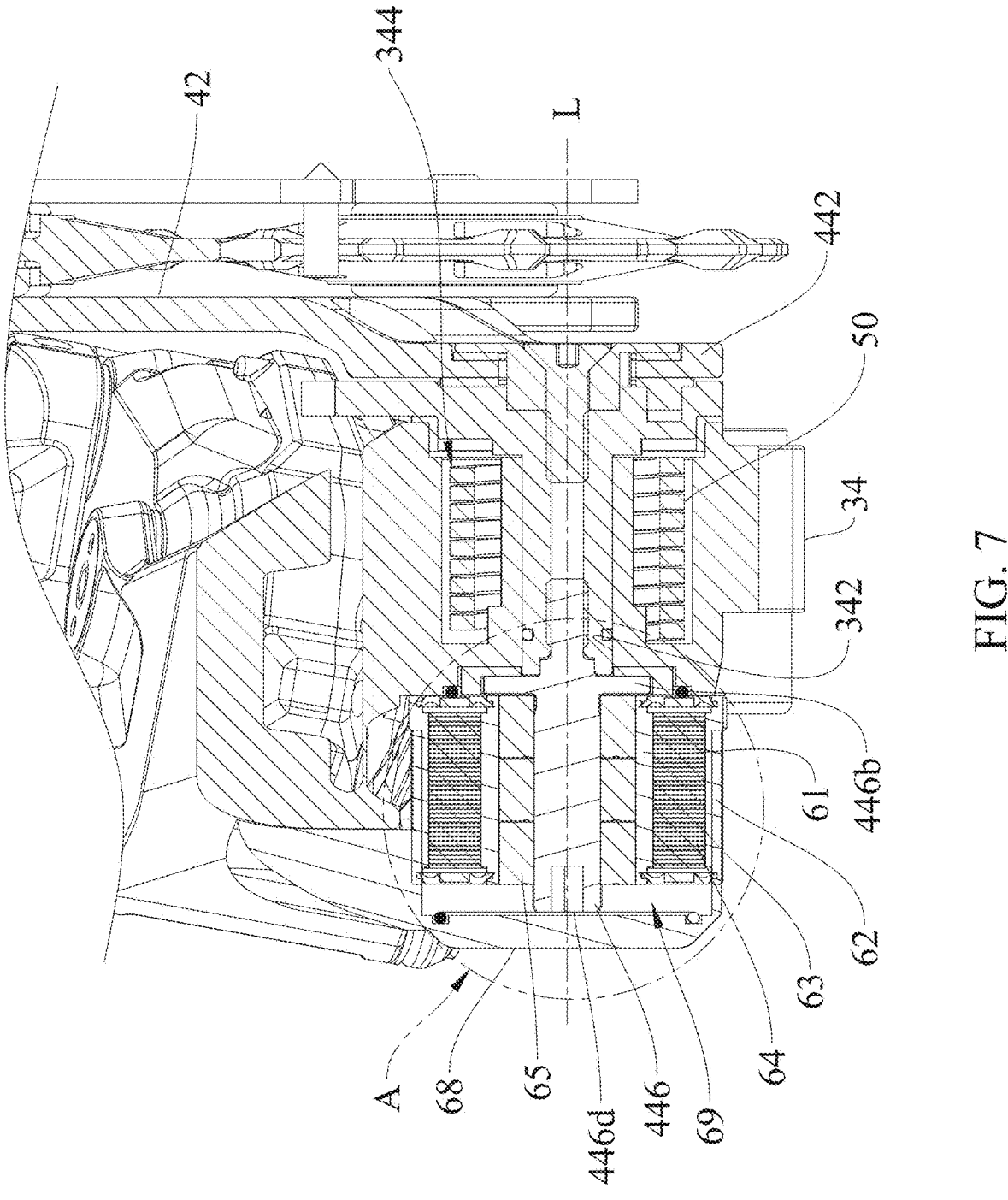
FIG. 7 is a sectional view along the 7-7 line in FIG. 1.
Figure 8:
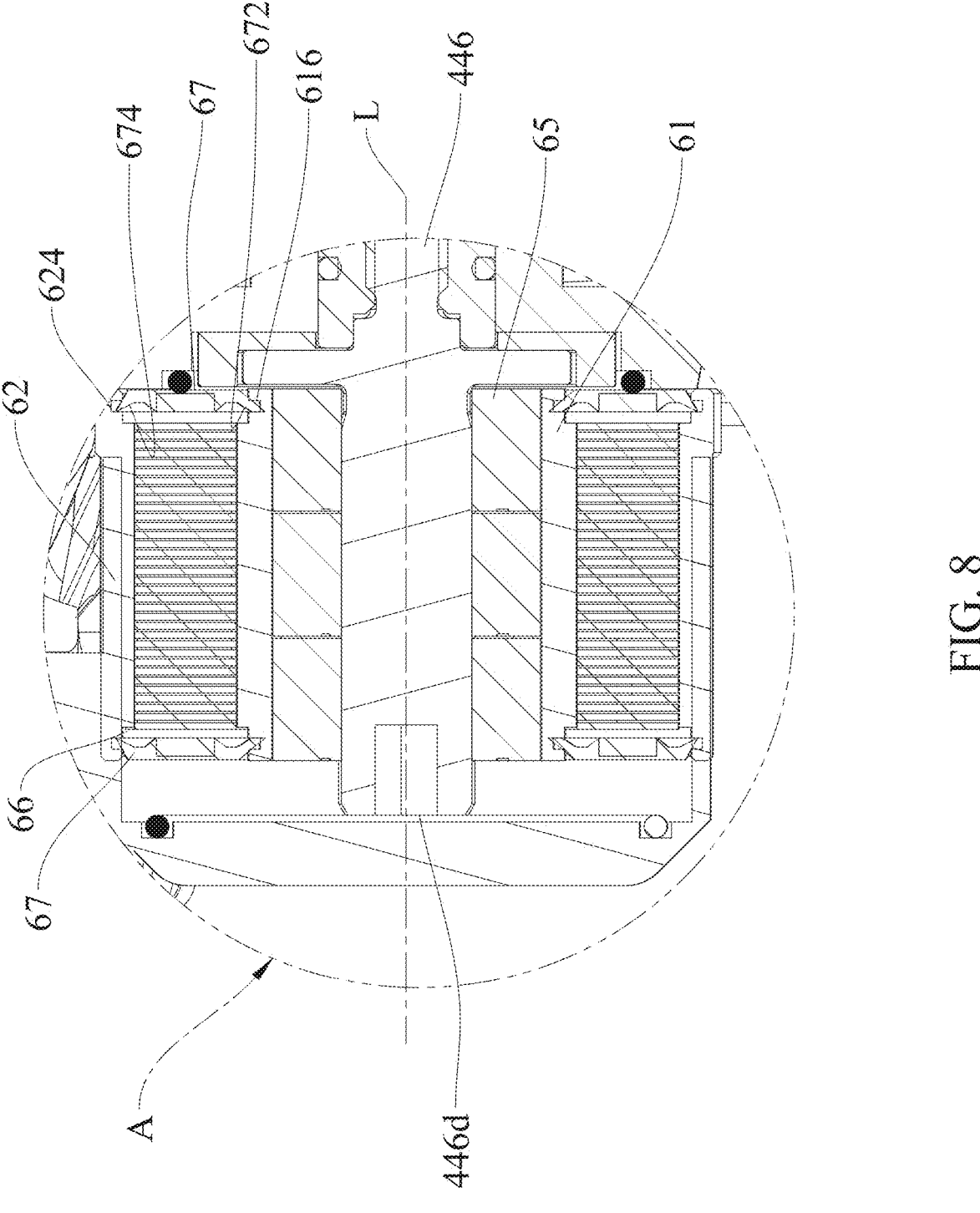
FIG. 8 is a partially enlarged view of a marked region A in FIG. 7.
Figure 9:
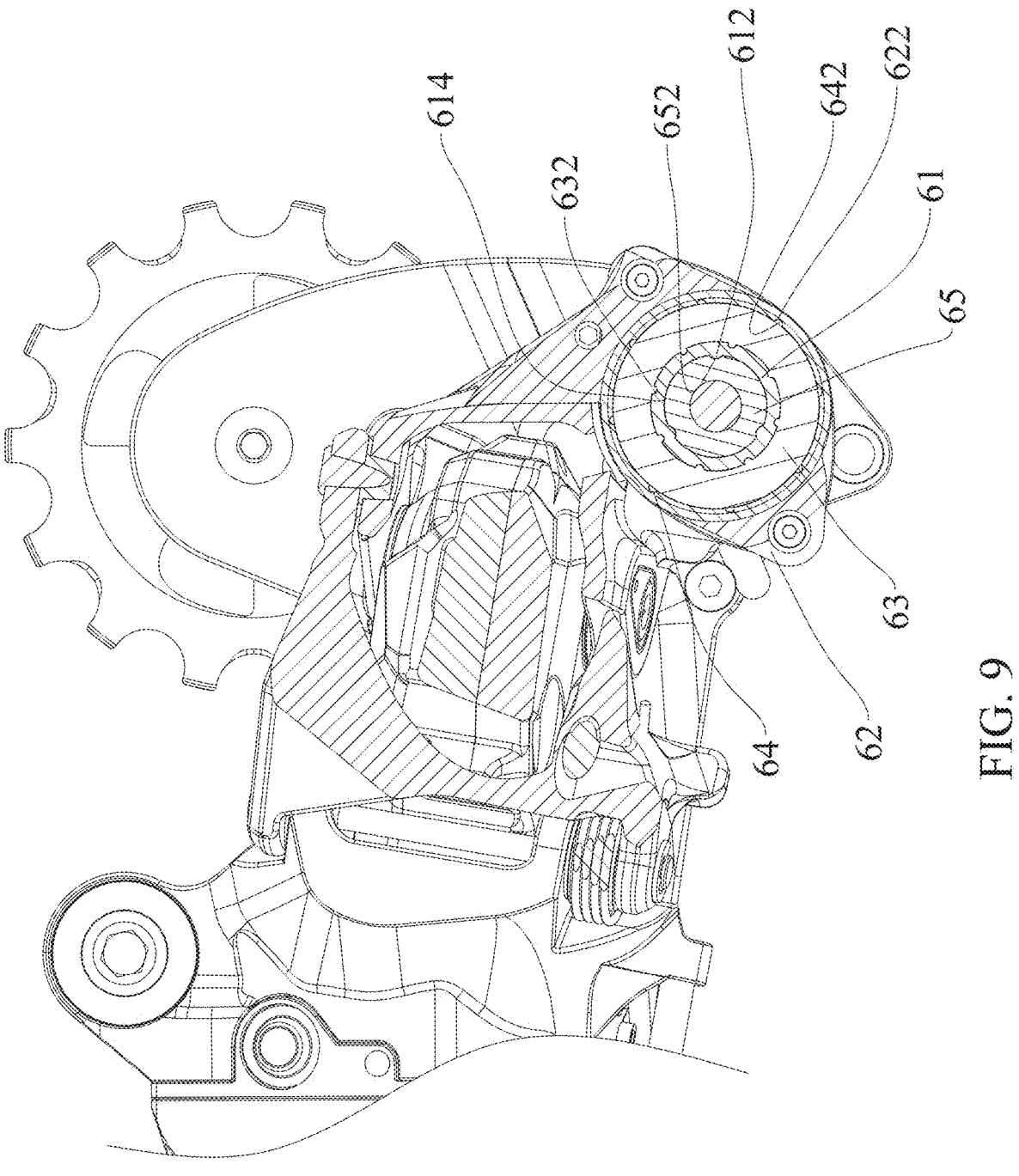
FIG. 9 is a sectional view along the 9-9 line in FIG. 2.

As shown in FIG. 1, FIG. 2, and FIG. 7, the movable portion 30 includes the second pivoting section 32 and a seat body 34 that are connected to each other. The second pivoting section 32 has two second pivoting ends 32a disposed opposite to each other. Each of the second pivoting ends 32a is pivotally connected to the linkage assembly 20. The seat body 34 has a shaft bore 342. A first accommodating chamber 344 is formed on a side of the seat body 34 facing a chain guide arm 42. The chain guide portion 40 includes the chain guide arm 42 and a shaft member 44 connected to the chain guide arm 42. The shaft member 44 passes through the shaft bore 342. The damping assembly 60 includes a casing 68. The casing 68 is engaged on another side of the seat body 34 away from the chain guide arm 42. A second accommodating chamber 69 is formed in the casing 68. The shaft bore 342 communicates with the first accommodating chamber 344 and the second accommodating chamber 69. During mounting, the resilient member 50 is sleeved on the shaft member 44 and is disposed in the first accommodating chamber 344. An end of the resilient member 50 is engaged with the chain guide arm 42, and the other end of the resilient member 50 is engaged with a surface of the seat body 34. The resilient member 50 is a torsion spring to provide a biasing force for the shaft member 44 in a first direction D1 (referring to FIG. 4). The first direction D1 is a rotation direction around an axis of shaft member 44, which serves as a center of rotation. Other resilient members capable of providing a biasing force could also be used as alternatives to the torsion spring in the embodiment.

Figure 4:
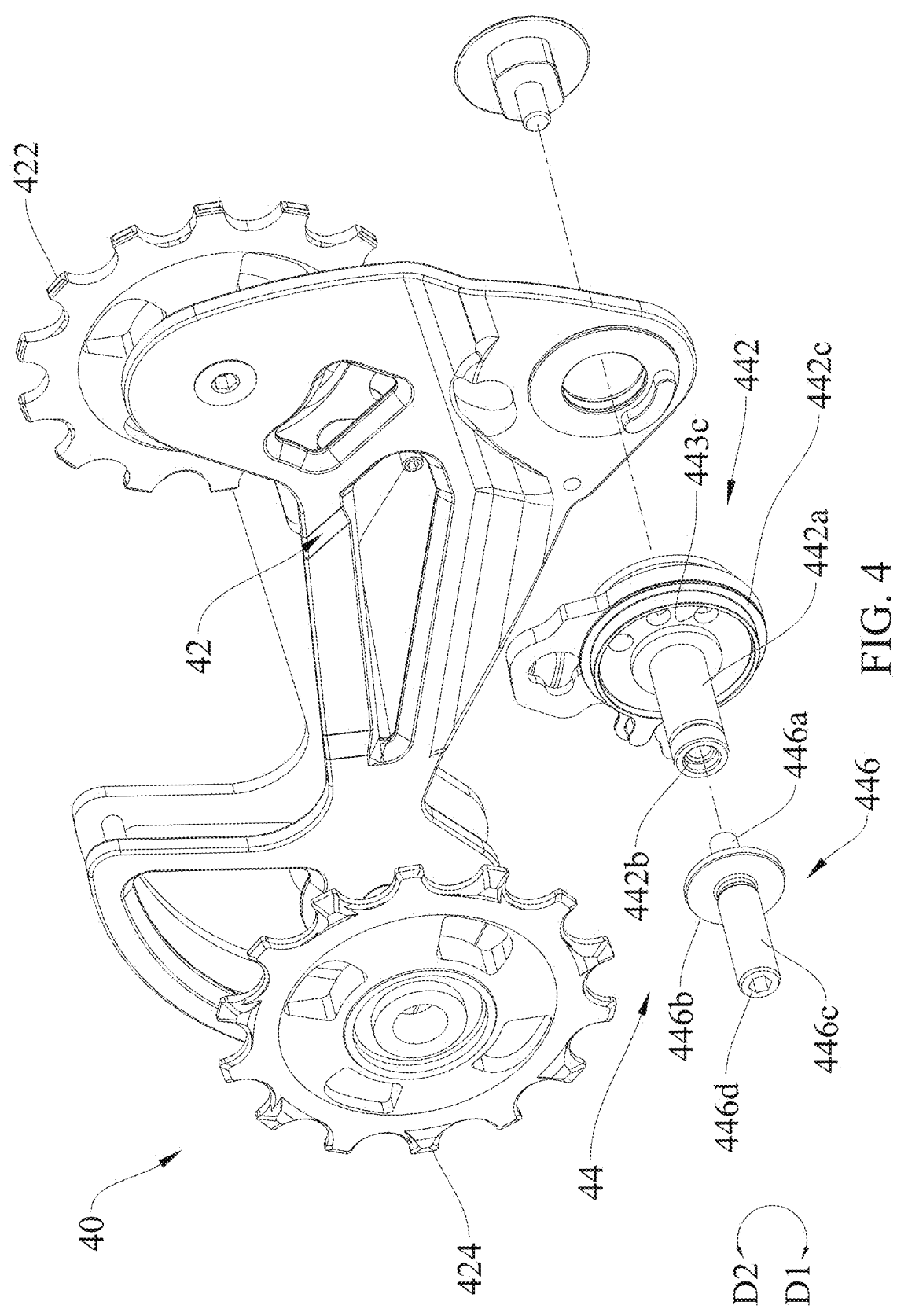
FIG. 4 is an exploded view of the chain guide portion of the rear derailleur with the damping function according to the embodiment of the present invention.
Figure 5:
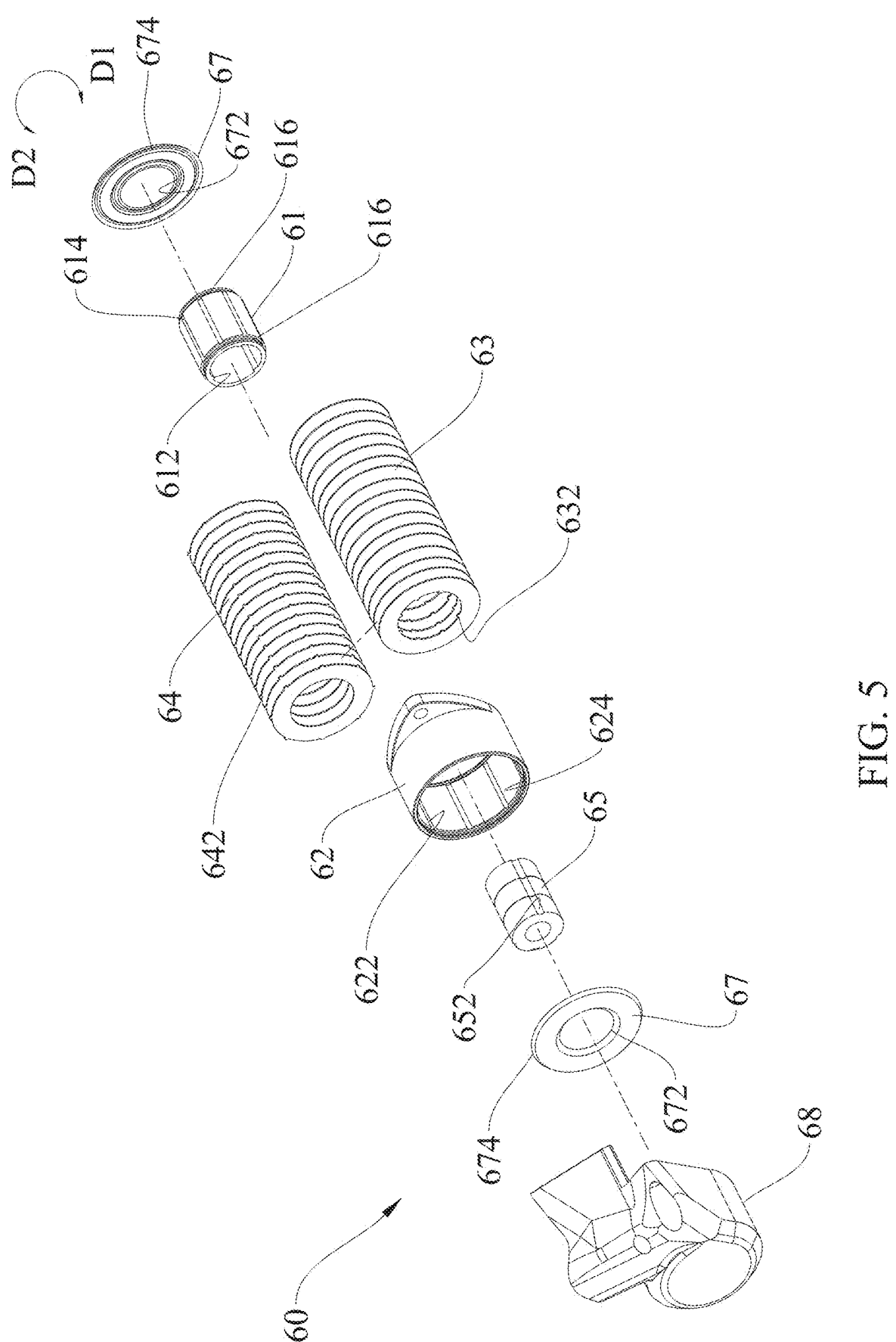
FIG. 5 is an exploded view of the damping assembly of the rear derailleur with the damping function according to the embodiment of the present invention.
Figure 6:
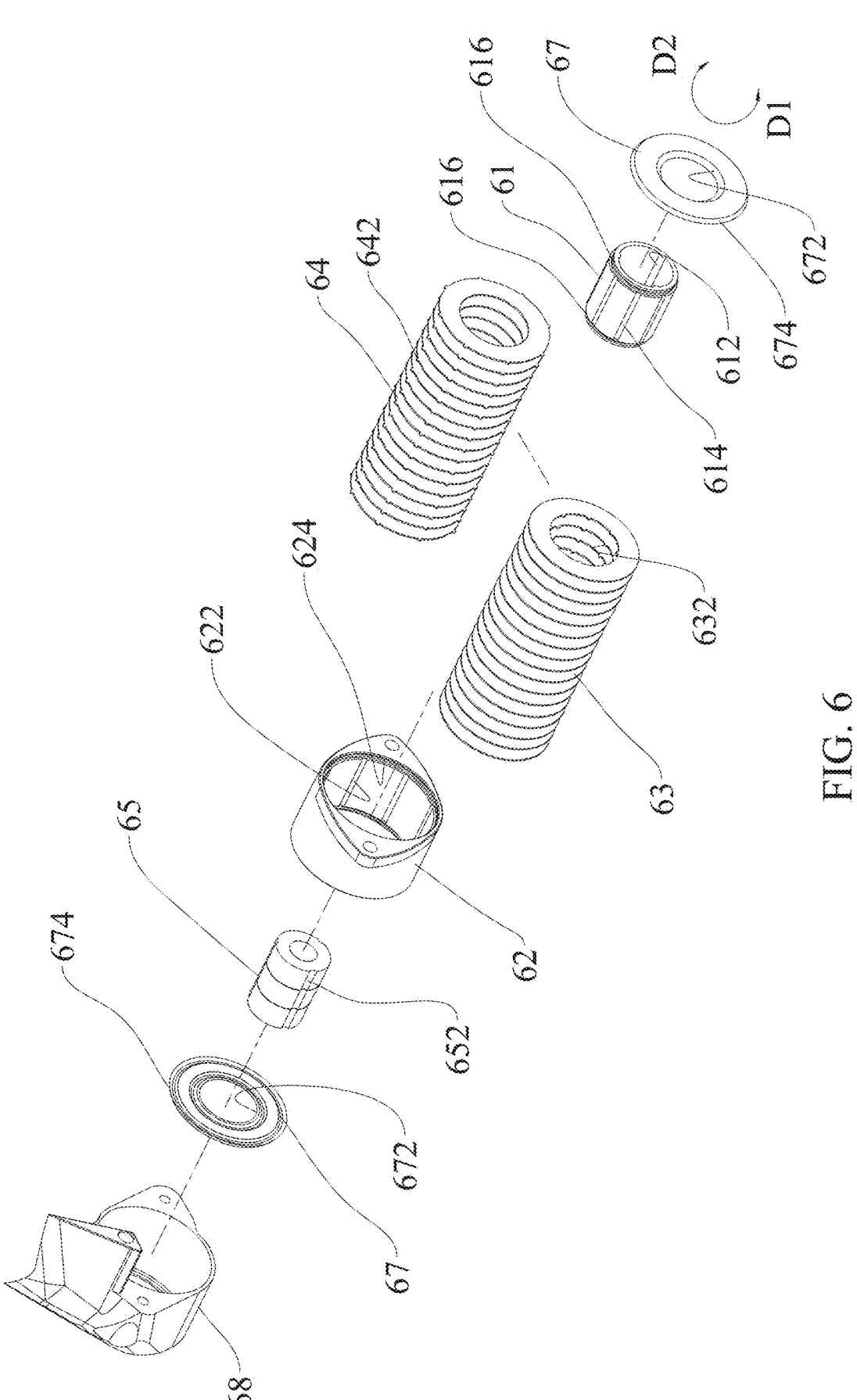
FIG. 6 is an exploded view of the damping assembly of the rear derailleur with the damping function according to the embodiment of the present invention from another perspective.

As shown in FIG. 4 and FIG. 7, a guide wheel 422 and a tension wheel 424 are rotatably connected to the chain guide arm 42 of the chain guide portion 40. The shaft member 44 connected to the chain guide arm 42 includes a base shaft 442 and a pivoting shaft 446. The base shaft 442 is engaged with the chain guide arm 42 and has a shaft rod 442a, a threaded hole 442b, and an adjuster 442c. The shaft rod 442a rotatably passes through the shaft bore 342. The threaded hole 442b is located at an outer end of the base shaft 442. The adjuster 442c is located at an inner end of the base shaft 442 and has a plurality of adjusting holes 443c around the base shaft 442. An end of the resilient member 50 is selectively engaged in one of the adjusting holes 443c, so that a fixing position of the end of the resilient member 50 could be adjusted, thereby changing a force of the resilient member 50 being biased initially. The pivoting shaft 446 has a first portion 446a, a flange 446b, and a second portion 446c that are coaxially and sequentially connected. The first portion 446a is a bolt and passes into the shaft bore 342 to be screwed into the threaded hole 442b of the base shaft 442. The flange 446b extends radially relative to the pivoting shaft 446. The flange 446b abuts against a peripheral edge of an end of the shaft bore 342. A tool hole 446d is provided at an outer end of the second portion 446c. The tool hole 446d could be used for a tool to rotate the pivoting shaft 446.

As shown in FIG. 4 to FIG. 9, the damping assembly 60 includes three one-way bearings 65, an inner ring 61, an outer ring 62, a plurality of first damping disks 63, and a plurality of second damping disks 64. The one-way bearings 65 are sleeved on the shaft member 44 and are engaged with an inner surface of the inner ring 61. An outer surface of the inner ring 61 is engaged with the first damping disks 63. The inner ring 61 is located within the outer ring 62. An inner surface of the outer ring 62 is engaged with the second damping disks 64 and is secured to the seat body 34.

More specifically, the one-way bearings 65 are sleeved on the second portion 446c of the pivoting shaft 446. Each of the one-way bearings 65 has a first fitting groove 652. The inner surface of the inner ring 61 has a first fitting block 612. The first fitting block 612 is fitted into the first fitting grooves 652 of the one-way bearings 65, so that the one-way bearings 65, the inner ring 61, and the first damping disks 63 are housed in the second accommodating chamber 69. An inner peripheral edge of each of the one-way bearings 65 is freely rotatable in the first direction D1 relative to an outer peripheral edge of each of the one-way bearings 65, so the shaft member 44 is freely rotatable in the first direction D1 relative to the inner ring 61 through the one-way bearings 65. In other embodiments, the number of the one-way bearings 65 could also be adjusted to one or three or more as required.

The first damping disks 63 and the second damping disks 64 are in a staggered arrangement. Each of the first damping disks 63 has a second fitting block 632. The outer surface of the inner ring 61 has a second fitting groove 614. The second fitting groove 614 is engaged with the second fitting blocks 632 of the first damping disks 63, thereby securing the first damping disks 63 to the inner ring 61. Each of the second damping disks 64 has a third fitting block 642. The inner surface of the outer ring 62 has a third fitting groove 622. The third fitting groove 622 is engaged with the third fitting blocks 642 of the second damping disks 64, thereby securing the second damping disks 64 to the outer ring 62. When the shaft member 44 rotates in the first direction D1, the shaft member 44 does not drive the first damping disks 63 to rotate in the first direction D1 relative to the second damping disks 64. In this way, when the chain of the bicycle meshes with the guide wheel 422 and the tension wheel 424 of the chain guide arm 42, the biasing force of the resilient member 50 in the first direction D1 drives the chain guide arm 42 to rotate in the first direction D1 to provide a tension of the chain.

A direction of the axis of the shaft member 44 is defined as an axial direction L. Two first annular grooves 624 are provided on two sides of the inner surface of the outer ring 62 in the axial direction L, respectively. Two second annular grooves 616 are provided on two sides of the outer surface of the inner ring 61 in the axial direction L, respectively. Each of the first annular grooves 624 is disposed opposite to each of the second annular grooves 616. The damping assembly 60 includes two seals 67 and a damping material 66. Each of the seals 67 is circular in shape and has an inner edge 672 and an outer edge 674. The outer edge 674 and the inner edge 672 of one of the seals 67 are fitted into one of the first annular grooves 624 and one of the second annular grooves 616, respectively. The outer edge 674 and the inner edge 672 of the other one of the seals 67 are fitted into the other one of the first annular grooves 624 and the other one of the second annular grooves 616, respectively. Each of the seals 67 is slidable between the inner ring 61 and the outer ring 62. The damping material 66 is filled between the first damping disks 63 and the second damping disks 64. The damping material 66 is sealed between the outer ring 62 and the inner ring 61 through the seals 67. The damping material 66 could be an oil or a fluid with a high viscosity coefficient.

When the chain of the bicycle swings due to an external force, or when the chain guide portion 40 is subjected to a vibration or an external force to cause the chain guide arm 42 to swing downward due to inertia, the shaft member 44 of the chain guide portion 40 drives the first damping disks 63 on the inner ring 61 to rotate in a second direction D2 through the one-way bearings 65. The second direction D2 is opposite to the first direction D1 and is also a rotation direction around the axis of the shaft member 44, which serves as the center of rotation. At this time, the shaft member 44 drives the first damping disks 63 to rotate relative to the second damping disks 64 through the one-way bearings 65, and the damping material 66 provides damping for the first damping disks 63 to rotate relative to the second damping disks 64, thereby reducing a speed and a degree of the chain guide arm 42 of the chain guide portion 40 rotating in the second direction D2 around the axis of the shaft member 44. In this way, the chain could be quickly returned to an original position after being swung by an external force, so that the problem that the chain falls off due to insufficient tension could be prevented.

In the embodiment, a damping force of the damping material 66 could be adjusted through a variety of ways to meet different requirements. More specifically, a damping effect could be adjusted by adjusting the quantity of the first damping disks 63 and the second damping disks 64. Additionally, the damping material 66 could also be replaced with fluids with different viscosity coefficients to further optimize the damping assembly 60.

In summary, when the bicycle is ridden on uneven road surfaces, the rear derailleur 100 with the damping function could produce the damping effect through the one-way bearings 65 working with the first damping disks 63, the second damping disks 64, and the damping material 66, thereby avoiding the problem that the biasing force of the resilient member 50 could not reset the chain guide arm 42 in time due to the excessive rotation of the chain guide arm 42 by the external force when the chain is swinging or flinging, and thus avoiding the chain falling problem due to insufficient tension. The present invention enables the resilient member 50 to instantly restore a position of the chain guide arm 42 to maintain the tension of the chain, so that the chain could stably mesh with a sprocket, thereby reducing the bicycle failure due to chain disengagement.

It must be pointed out that the embodiments described above are only some preferred embodiments of the present disclosure. All equivalent structures which employ the concepts disclosed in this specification and the appended claims should fall within the scope of the present disclosure.

What is claimed is:

1. A rear derailleur with a damping function, comprising a base portion, comprising a frame engaging section and a first pivoting section that are connected to each other; a linkage assembly, comprising a first linkage and a second linkage, wherein an end of the first linkage and an end of the second linkage are pivotally connected to the first pivoting section, respectively; a movable portion, comprising a second pivoting section and a seat body that are connected to each other, wherein the other end of the first linkage and the other end of the second linkage are pivotally connected to the second pivoting section, respectively, so that the first pivoting section, the linkage assembly, and the second pivoting section form a four-bar linkage; the seat body has a shaft bore; a chain guide portion, comprising a chain guide arm and a shaft member connected to the chain guide arm, wherein a guide wheel and a tension wheel are rotatably connected to the chain guide arm, and the shaft member passes through the shaft bore; a resilient member, disposed between the seat body and the chain guide portion and providing a biasing force for a rotation of the chain guide portion; and a damping assembly, comprising an inner ring, an outer ring, a plurality of first damping disks, a plurality of second damping disks, and at least one one-way bearing, wherein the inner ring is located within the outer ring, and an outer surface of the inner ring is engaged with the first damping disks; the outer ring is fixed to the seat body, and an inner surface of the outer ring is engaged with the second damping disks; the first damping disks and the second damping disks are in a staggered arrangement, and a damping material is filled between the first damping disks and the second damping disks; the at least one one-way bearing is engaged with an inner surface of the inner ring; the at least one one-way bearing is sleeved on the shaft member; the shaft member is freely rotatable in a first direction relative to the inner ring through the at least one one-way bearing; wherein when the shaft member of the chain guide portion drives the first damping disks on the inner ring through the at least one one-way bearing to rotate in a second direction opposite to the first direction, the damping material provides damping for the first damping disks to rotate relative to the second damping disks.

2. The rear derailleur as claimed in claim 1, wherein the inner surface of the inner ring has a first fitting block, the at least one one-way bearing has a first fitting groove, and the first fitting block is fitted into the first fitting groove.

3. The rear derailleur as claimed in claim 2, wherein the outer surface of the inner ring has a second fitting groove, each of the first damping disks has a second fitting block, and the second fitting groove is engaged with the second fitting blocks of the first damping disks.

4. The rear derailleur as claimed in claim 3, wherein the inner surface of the outer ring has a third fitting groove, each of the second damping disks has a third fitting block, and the third fitting groove is engaged with the third fitting blocks of the second damping disks.

5. The rear derailleur as claimed in claim 1, wherein the damping assembly comprises two seals, and each of the seals is circular in shape and has an inner edge and an outer edge.

6. The rear derailleur as claimed in claim 5, wherein a direction of an axis of the shaft member is defined as an axial direction; two first annular grooves are provided on two sides of the inner surface of the outer ring in the axial direction, respectively; two second annular grooves are provided on two sides of the outer surface of the inner ring in the axial direction, respectively; each of the first annular grooves is disposed opposite to each of the second annular grooves; the outer edge and the inner edge of one of the seals are fitted into one of the first annular grooves and one of the second annular grooves, respectively; the outer edge and the inner edge of the other one of the seals are fitted into the other one of the first annular grooves and the other one of the second annular grooves, respectively; each of the seals is slidable between the inner ring and the outer ring.

7. The rear derailleur as claimed in claim 1, wherein a first accommodating chamber is formed on a side of the seat body facing the chain guide arm, and the first accommodating chamber surrounds the shaft bore; the damping assembly comprises a casing; the casing is engaged on another side of the seat body away from the chain guide arm; a second accommodating chamber is formed in the casing; the shaft bore communicates with the first accommodating chamber and the second accommodating chamber.

8. The rear derailleur as claimed in claim 7, wherein the resilient member is a torsion spring and is located in the first accommodating chamber; an end of the resilient member is engaged with the chain guide arm, and another end of the resilient member is engaged with the seat body.

9. The rear derailleur as claimed in claim 7, wherein the shaft member comprises a base shaft and a pivoting shaft; the base shaft is engaged with the chain guide arm and has a shaft rod; the shaft rod rotatably passes through the shaft bore; a threaded hole is provided at an outer end of the base shaft; the pivoting shaft has a first portion, a flange, and a second portion that are coaxially and sequentially connected, the first portion is a bolt and passes into the shaft bore; the flange abuts against a peripheral edge of an end of the shaft bore; a tool hole is provided at an outer end of the second portion.

10. The rear derailleur as claimed in claim 9, wherein the at least one one-way bearing is sleeved on the second portion of the pivoting shaft.

* * * * *